United States Patent [19]

Hatch

[11] 4,260,922
[45] Apr. 7, 1981

[54] INTEGRAL COLLECTOR PUMP FOR HIGH SPEED MACHINE

[75] Inventor: Burton D. Hatch, Ballston Lake, N.Y.

[73] Assignee: General Electric Company, Schenectady, N.Y.

[21] Appl. No.: 58,220

[22] Filed: Jul. 16, 1979

[51] Int. Cl.³ .............................................. H02K 7/14
[52] U.S. Cl. .................................... 310/178; 310/219; 417/50
[58] Field of Search ............... 310/219, 178, 232, 112, 310/114; 318/253; 322/48; 417/50

[56] References Cited

U.S. PATENT DOCUMENTS

| | | | |
|---|---|---|---|
| 3,211,936 | 10/1965 | Harvey | 310/178 |
| 3,546,508 | 12/1970 | Harvey | 310/219 |
| 3,585,398 | 6/1971 | Harvey | 310/178 |
| 3,705,995 | 12/1972 | Chabrerie | 310/219 |
| 3,743,874 | 7/1973 | Chabrerie | 310/178 |
| 3,916,235 | 10/1975 | Massar | 310/178 |
| 3,989,968 | 11/1976 | Hatch | 310/178 |
| 4,027,183 | 5/1977 | Hatch | 310/219 |
| 4,027,184 | 5/1977 | Hurley | 310/219 |
| 4,146,807 | 3/1979 | Hatch | 310/219 |
| 4,156,155 | 5/1979 | Cannell | 310/219 |

FOREIGN PATENT DOCUMENTS 1266621  3/1972  United Kingdom ................ 310/178

Primary Examiner—R. Skudy
Attorney, Agent, or Firm—Nathan D. Herkamp; James C. Davis, Jr.; Paul R. Webb, II

[57] ABSTRACT

A constant supply of liquid metal for current collectors in an electrodynamic machine is provided by passing armature current radially through a quantity of liquid metal disposed in a circumferential groove in the stator and passing field flux generated by the machine field coil axially through said liquid metal disposed in said groove to act as a pump to circulate said liquid metal. In a disk-type acyclic machine, passages within each stator disk direct a flow of liquid metal from said quantity disposed in said groove in a generally radial direction to maintain a continuous supply of liquid metal to a current collector disposed about the radially-inner surface of said stator disk. Axial passages provide a continuous supply of liquid metal axially from said groove to a current collector disposed axially adjacent said stator disk. Liquid metal supplied to said current collectors is resupplied to said groove through a slot in said stator disk for passage of liquid metal from said current collector adjacent said stator disk to said groove.

12 Claims, 3 Drawing Figures

INTEGRAL COLLECTOR PUMP FOR HIGH SPEED MACHINE

The invention herein described was made in the course of or under contract with the U.S. Navy.

BACKGROUND OF THE INVENTION

This invention relates to acyclic machines, and more particularly, to such machines utilizing a plurality of liquid metal current collectors providing electrical connections between the rotor and stator members thereof. Such machines include the disk-type acyclic machine described in U.S. Pat. No. 3,585,398, issued June 15, 1971 to L. M. Harvey and assigned to the instant assignee, a disk/drum type acyclic machine as disclosed in my U.S. patent application Ser. No. 898,923, filed Apr. 21, 1978, now U.S. Pat. No. 4,208,600, issued June 17, 1980 and assigned to the instant assignee, and drum-type acyclic machines.

In high current operation of acyclic machines, it is necessary to provide a reliable high current capacity contact between rotor and stator disks. In machines using liquid metal current collectors, this requires a constant supply of liquid metal to the current collectors in order to continuously wet the contact surfaces between rotor and stator disks and bridge the gap between the contact surfaces. At high speeds of operation, the centrifugal force and Lorentz expulsion forces tend to drive the liquid metal from the radially-inner current collectors. If the liquid metal is expelled from said current collectors, the collectors would operate dry, in which condition the current-carrying capacity of the current collectors is inadequate for high current density machines. Severe damage to the current-carrying contact surfaces of the current collectors would quickly follow.

Prior art methods and apparatus for circulating liquid metal in a current collector include that disclosed in my U.S. Pat. No. 4,027,183, issued May 31, 1977 and assigned to the instant assignee, and that disclosed in U.S. Pat. No. 4,027,184, issued May 31, 1977 to Hurley, and assigned to the instant assignee. These disclosures are drawn to localized circulation of liquid metal around a single current collector, and require a large quantity of liquid metal in the gap separating the stator and the rotor. The large quantity of liquid metal required for these current collectors causes large viscous losses due to frictional contact between the rotor surfaces moving relative the liquid metal in contact with the rotor.

A prior art liquid metal supply system employing an external pumping system to provide liquid metal to current collectors is disclosed in U.S. Pat. No. 3,211,936, issued Oct. 12, 1965 to Harvey, and assigned to the instant assignee. Such a technique requires substantial external equipment and connections to the machine to provide a continuous supply of liquid metal.

Still another method of liquid metal circulation is described in my U.S. Pat. No. 3,989,968, issued Nov. 2, 1976, and assigned to the instant assignee. Liquid metal circulation is provided in the vicinity of a single collector ring by liquid metal circulation around an intermediate current collector to provide continuous liquid metal contact between the stator and rotor collector rings.

One technique to provide liquid metal circulation within an acyclic machine is described in my U.S. patent application Ser. No. 924,055, filed July 12, 1978, now U.S. Pat. No. 4,207,486, issued June 10, 1980, and assigned to the instant assignee. In this patent application, kinetic energy imparted to liquid metal within a current collector is converted into pressure by a scoop, which collects a portion of the circulating liquid metal and supplies a pressurized flow of liquid metal from a radially-outer current collector to a radially-inner current collector. A return flow path is provided within the stator disk to maintain continuous circulation of liquid metal within the machine.

The primary object of the instant invention is to provide a method and apparatus to provide an automatic and reliable supply of liquid metal to the current collectors of an acyclic machine at all speeds of operation.

A second object is to provide a reliable supply of liquid metal to current collectors, while employing a minimum quantity of liquid metal in each current collector site, so as to reduce to a minimum the viscous drag losses at high rotational speed.

A further object of the instant invention is to eliminate the necessity for external pumps and related liquid metal conditioning auxiliaries for high speed acyclic generators without introduction of additional moving parts within the machine itself, and without adding substantially to the machine complexity.

SUMMARY OF THE INVENTION

An integral collector pump is provided within an acyclic machine by configuring the liquid, electrical and magnetic circuits within the machine itself, so that a portion of the armature current and portion of the generator field act upon the liquid metal within a groove in flow communication with each pair of current collectors to produce a pressurized source of liquid metal for each collector site. In a particular embodiment, a circumferential groove is provided around the outer periphery of each stator collector disk, so that a portion of the radially-directed armature current passing through the stator disk will pass through the liquid metal disposed in the groove, and a portion of the magnetic flux generated by the machine field coil will pass in a generally axially direction through liquid metal disposed within the groove. The interaction of the armature current and the field flux creates a force tending to move the liquid metal in the circumferential direction determined by the electrical current through the liquid metal. An opening in the stator disk adjacent the groove provides a passage for flow of liquid metal from the current collector adjacent the stator disk into the circumferential groove. Passages extending in a generally radial direction through the stator disk supply a flow of pressurized liquid metal to a current collector located at the radially-inner surface of said stator disk, and axial passages in a stator mounting ring provide a flow of pressurized liquid metal to the current collector axially adjacent the stator disk.

BRIEF DESCRIPTION OF THE DRAWINGS

Features of the invention believed to be novel and unobvious over the prior art are set forth with particularity in the appended claims. The invention itself, however, as to organization, method of operation and objects and advantages thereof may best be understood by reference to the following description taken in conjunction with the accompanying drawings wherein:

MANNER AND PROCESS OF MAKING AND USING THE INVENTION

Figure 1:
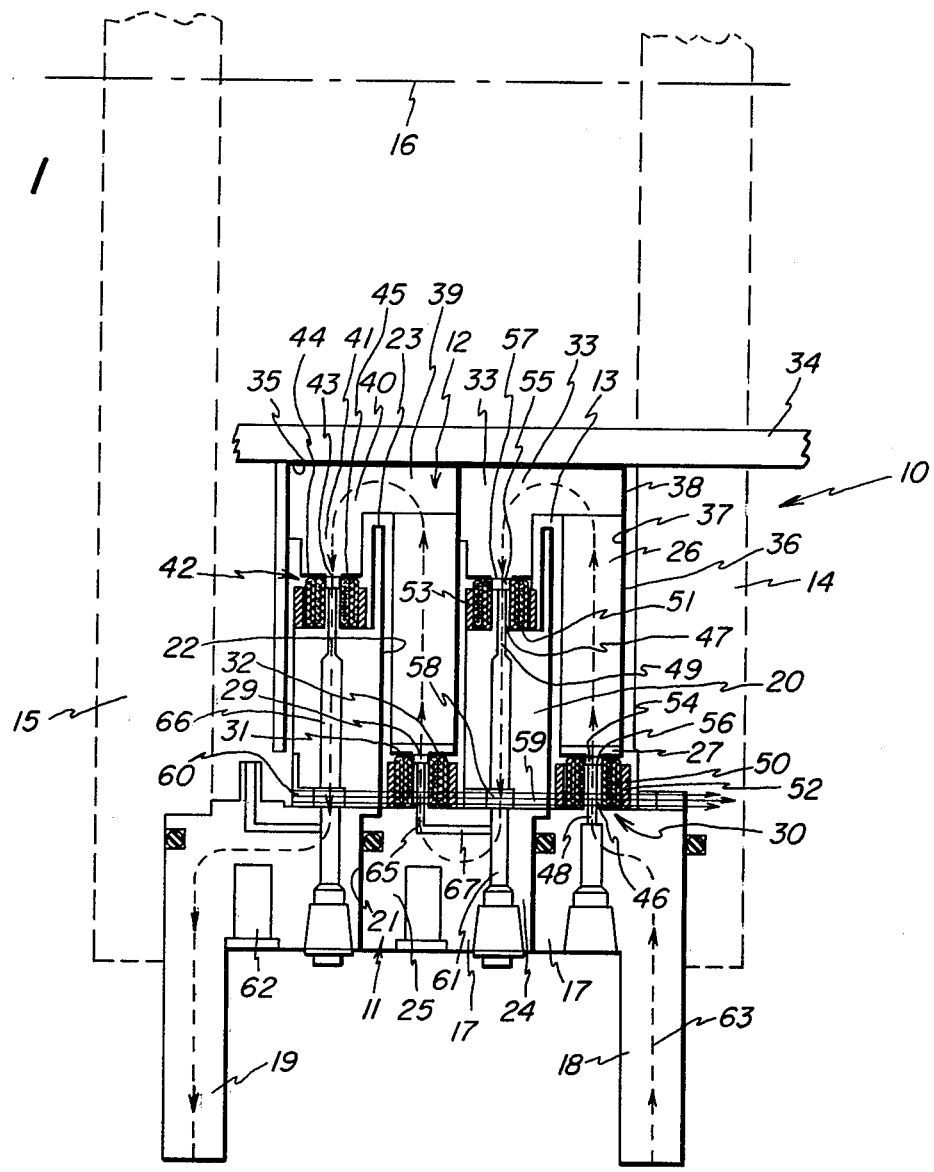
FIG. 1 is a partial cross-sectional view schematically illustrating a disk-type machine incorporating the integral liquid metal collector pump of the instant invention.
Figure 2:
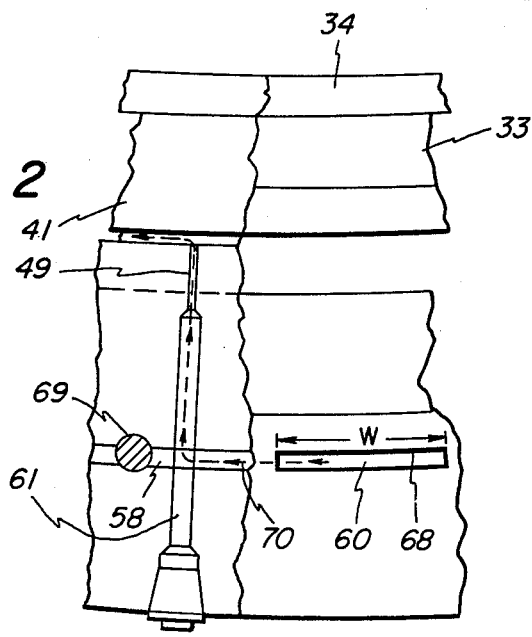
FIG. 2 is a schematic partial cross-sectional view schematically illustrating one portion of the integral collector pump of the instant invention.
Figure 3:
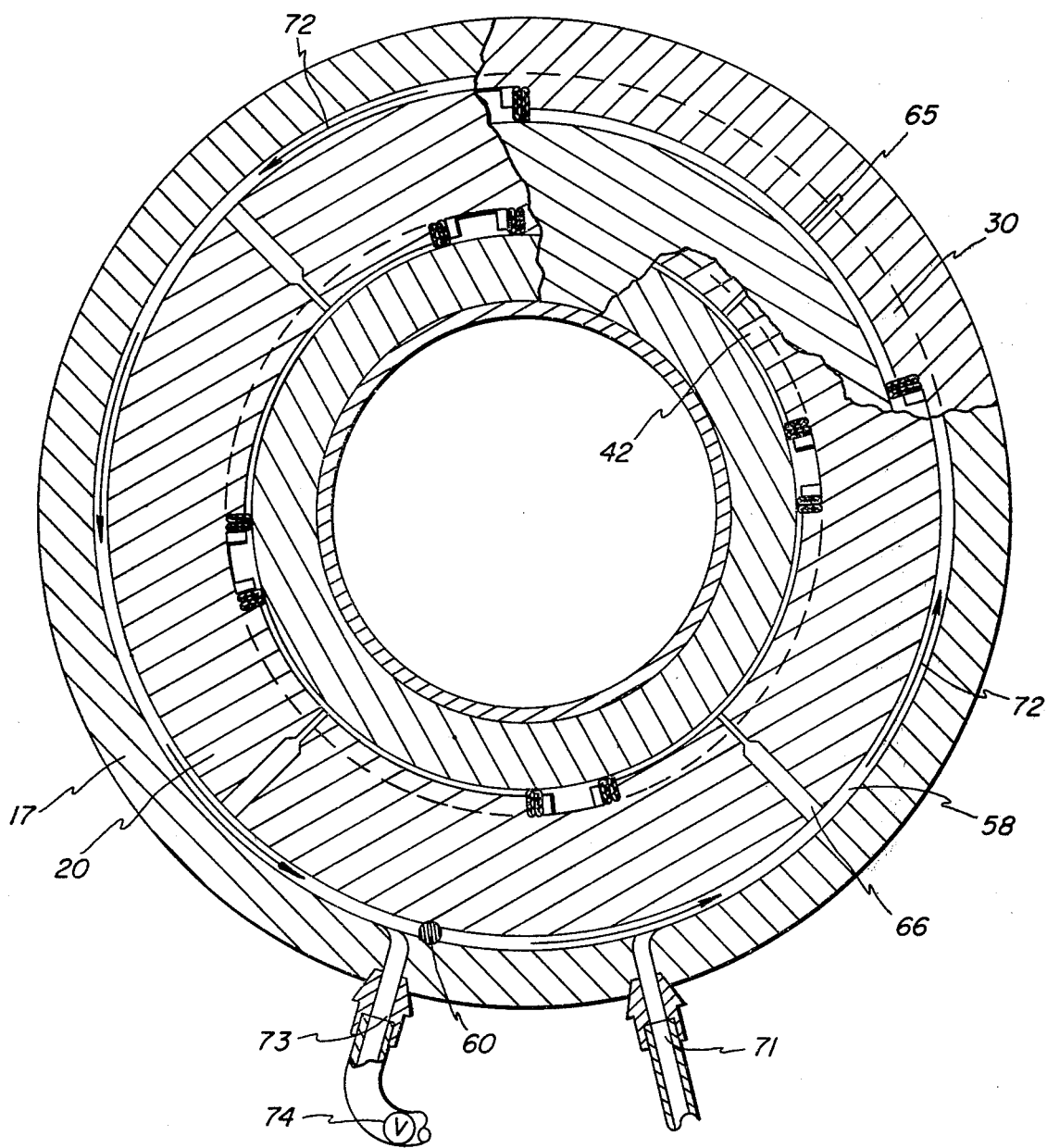
FIG. 3 is a schematic cross-sectional view, having parts broken away, of a machine incorporating the integral collector pump of the instant invention.

The specific features of the instant invention described herein and shown in FIGS. 1-3 are merely exemplary, and the scope of the invention is defined in the appended claims.

The machine partially illustrated herein utilizes high current density field coils, such as superconducting field coils, to provide a high density magnetic field. Such high flux density machines provide increased output torque when operating as a motor, and increased output current when operating as a generator as compared to lower flux density room temperature metal coil machines. Due to the high current-carrying capacity required in such machines, liquid metal current collectors are employed to make electrical connections between adjacent rotor and stator disks. A reliable constant supply of liquid metal is required to ensure adequate current-carrying capacity at all speeds of operation. By utilizing the instant invention, the quantity of liquid metal required to ensure adequate contact is kept at a minimum, thereby, minimizing losses of machine efficiency due to viscous drag.

A disk-type acyclic machine 10 as illustrated in FIG. 1, comprises a stator 11, rotor 12 rotatable with respect to the stator and separated therefrom by a gap 13. Bearings (not shown) are provided to maintain the gap 13 between stator 11 and rotor 12 to ensure adequate mechanical clearance and, in the instant invention, to provide space for liquid metal current collectors between stator 11 and rotor 12. Stator 11 comprises shielding sections 14 and 15, shown in phantom, which include bearings and appropriate connection apparatus for supporting rotor 12 for rotation about its longitudinal axis 16. Stator 11 also includes a plurality of stator collector rings 17 made of conductive material such as copper and fastened together by bolts or similar support means. The end stator collector rings include terminals 18 and 19 for making electrical connection between the machine armature circuit and an outside circuit. If the machine is operating as a generator, the external circuit would be a load circuit, and if the machine is to be operated as a motor, the external circuit would be a current source for the armature current.

Attached to each stator collector ring 17 is a stator disk 20, made of electrically conductive material, usually copper or its alloys, or iron or its alloys. Adjacent stator collector rings 17 are electrically insulated from each other by a layer 21, shown greatly enlarged, of an appropriate insulating material, such as alumina. The layer 21 of insulating material extends along one axial side 22 of each stator disk 20 and over projection 23 to prevent shorting between adjacent stator and rotor disks. Each stator collector ring 17 as shown in FIG. 1, is configured to provide a disk mounting portion 24 and a current collector support portion 25.

Rotor 12 comprises a plurality of concentric rotor disks 26, usually made of copper, copper alloy, iron or alloy of iron, interleaved with said plurality of stator disks 20. If the rotor disks are made of iron or an iron alloy, a conductive rotor collector ring 27 will be attached by electron-beam welding or other suitable technique to the radially-outer surface 28 of each rotor disk 26. The conductive rotor collector ring 27 is sually made of copper or a copper alloy, and has a narrow annular contact area 29 for making electrical contact with a juxtaposed stator collector ring 17 through a current collector 30. Adjacent contact area 29 are two annular rings 31 and 32 of insulation, such as alumina. The rotor collector ring 27 may provide contact area 29 by a radial extension between the insulating rings 31 and 32, or the insulating rings 31 and 32 may be applied to the radially-outer periphery of the rotor disk as a pair of projecting shoulders.

Rotor disks 26 are mounted on conductive mounting rings 33, usually made of copper or a copper alloy, affixed to a hollow rotor shaft 34 by a key arrangement (not shown) or other appropriate fastening device. Rotor shaft 34 is usually made of steel and is insulated from the rotor mounting rings 33 by a layer 35 of insulation, such as alumina. Rotor disks 26 and mounting rings 33 have a layer 36 of insulation, such as alumina coating one axial side 37 of rotor disk 26 and 38 of rotor disk mounting ring 33. The mounting ring 33 includes a disk mounting portion 39 and axial extension 40 which includes an annular protruding portion 41 for making electrical contact at current collector 42 between the disk mounting ring 33 and stator disk 20. Extension 41 includes an annular contact surface 43 and annular insulating rings 44 and 45 similar to rings 31 and 32 on collector ring 27 described above. The layers 22 and 36 of insulating material, together with the layer 35 on the rotor shaft 34, prevent electrical shorting between adjacent rotor disks 26 and support rings 33.

As shown in FIG. 1, a radially-inner current collector 42 and a radially-outer current collector 30 are connected to each stator collector ring 17. Each of current collectors 30 and 42 comprises a compliant cage raceway-type current collector as described in my copending U.S. patent application Ser. No. 23,809, filed Mar. 26, 1979 assigned to the instant assignee, and incorporated herein by reference. Current collectors 30 and 42 include stator fins 46, 47, respectively, having liquid metal supply passages 48, 49, respectively, disposed therein. Surrounding the fins 46 and 47 is a compliant wall 50 and 51, respectively, each comprising two layers of insulating nonconductive material such as glass or alumina fibers or a conductive metal filament coated with insulation and surrounded by a clamp ring 52, 53, respectively, which fastens the compliant wall frictionally to the stator fin 46, 47, respectively. Spaces 54, 55 defined axially and circumferentially by compliant wall 50, 51 and radially by radially innermost surfaces 56, 57, respectively, of stator fins 46, 47 and rotor current collector ring 29, 43, respectively, comprise liquid metal contacts filled with a liquid metal such as sodium potassium eutectic (NaK) which completes electrical contact between the rotor collector ring and the stator collector fin.

In the instant invention, a circumferential groove 58 is cut in the radially-outer periphery 59 of each stator disk. An axial slot 60 of width W, see FIG. 2, provides a suitable entrance for liquid metal to enter the groove from the original quantity of liquid metal placed in each radially-outer current collector 30 site. A plug 69 is disposed in the circumferential groove 58 to block flow of liquid metal at at least one point around the periphery of groove 58.

In operation of the instant invention, liquid metal is supplied to each stator collector ring 17 through inlet passages 61 which extend radially into the stator collector ring 17. Coolant is supplied to each of the current collector rings via the coolant channels 62. Armature current flows along the path indicated by the dashed line 63. The proportion of the total armature current which flows through the liquid metal in groove 58 is determined by the relative conductivities of the stator disk material and the liquid metal disposed in groove 58. Field flux passes generally axially through the stator disks, and a portion thereof passes through the liquid metal disposed in the circumferential groove as shown by arrows 64.

The interaction of the radially-flowing current with the axially-directed field flux produces a circumferential force in material disposed at a location through which the current and flux pass. This is the force which produces useful torque in a motor disk. This same interaction likewise produces a circumferential force in each portion of liquid metal in the groove through which the radial armature current and the axial field flux pass. Thereby, liquid metal is caused to circulate circumferentially about the stator disk as shown by arrows 70, FIG. 2. With the terminal configuration shown in FIG. 1, in which groove 58 and slot 60 are located in the iron portion of the stator disks 20, the surfaces of the axial inlet slots may be insulated with a layer 68 of alumina, or other appropriate insulation, to eliminate any Lorentz forces upon the liquid metal, which might impede the flow of liquid metal from the pool surrounding the current collector into each groove.

Plug 69 disposed in circumferential groove 58 serves to block the circumferential flow of liquid metal about the periphery of the stator disk 20. In the absence of circumferential flow, all of the circumferential force generated in the liquid metal in each groove produces an accummulated pressure in the liquid. Thus, a pressure is available at each of a number of circumferentially-distributed collector feed holes 65, 66, as shown in FIG. 3, into each of the outer and inner current collectors, 30, 42, respectively. The outer current collector 30 is supplied by an axially-extending passage 67 which is in flow communication with the radially-extending passage 65 which is in flow communication with space 54 within the compliant raceway 50. Feed hole 66 connects the groove with the supply passage 49 for current collector 42.

In operation of the machine, liquid metal is pumped circumferentially by rotation of rotor disk 26 through the liquid metal disposed in the radially-outer current collectors 30. This circumferential motion of the liquid metal causes a portion of the liquid metal in each radially-outer current collector site to pass through slot 60 into circumferential groove 58 where the combination of axially-directed flux and radially-directed current flow causes a force upon each segment of the liquid metal tending to circulate said metal about the periphery of the stator disk.

In FIG. 3, a cross-sectional view showing the application of my invention to a system incorporating a plurality of circumferentially-spaced compliant raceway-type current collectors 30, 42, is illustrated. In FIG. 3, four raceway current collectors 42 spaced uniformly circumferentially about the stator disks are supplied by individual liquid metal feed passages 66, respectively. In the broken-out section, a feed passage 65 for a current collector 30 disposed at the radially-outer circumference of rotor disk 26 is illustrated. Each of these current collectors is illustrated as comprising a set of compliant raceway-type current collectors supplied by liquid metal feed passages connected to a pumping groove 58.

In operation of the machine illustrated in FIG. 3, liquid metal is supplied by a feed passage 71 through the stator collector ring 17. Due to the pumping described above, the liquid metal moves in a generally counterclockwise motion as shown by arrows 72. Each increment of liquid metal experiences a force in the circumferential direction tending to move that increment about the periphery of stator disk 20. The increment of force produces an accummulated pressure which rises circumferentially about the machine reaching its highest point at plug 69 within groove 58. At each of the radial supply passages 66, liquid metal flows from groove 58 to supply radially-inner current collector 42, and at each of the axial supply passages 67 liquid metal flows from groove 58 to supply radially-outer current collector 30, thereby, causing a pressure dop at the location of each supply passage opening into the circumferential groove. The pressure in the liquid metal then drops to some level below that in the liquid metal located immediately before the liquid metal supply passage, and again rises in the circumferential direction until another supply passage drains off some of the liquid metal from groove 58. At a circumferential spacing of approximately 350°, an outlet passage 73 is connected to circumferential groove 58 and connected to appropriate piping to withdraw excess liquid metal from the system and having a valve 74 or other flow restricting means to maintain the liquid metal pressure at the point of exit from groove 58 at a predetermined level. Outlet passage 73 and feed supply passage 71 are each connected to external equipment (not shown) which may be used to filter, cool and degas the liquid metal exiting the machine.

The passages 48 in the left-hand end fin 46 (as viewed in FIG. 1) may be plugged or may be monitored to verify liquid metal pressure. The passages 48 in the right-hand end fin 46 may be supplied with liquid metal by a groove disposed in collector portion 25, or the terminal 18 may be attached to shield section 14 to provide current flow through a groove 58 disposed within section 14 such that armature current and field flux flow therethrough.

An alternative embodiment for accomplishing the distributed feed supply as illustrated in FIG. 3 incorporates a pair of liquid metal feed passages and a pair of exit passages to the stator collector ring from each other. Thereby, an independent system of supply would be provided for each side of the machine. A pair of plugs similar to plug 69 blocking groove 58 shown in FIG. 3 would be located in the groove at approximately 175° from the feed passage, so that maximum pressure would occur at the point in the groove where each plug blocks the flow of liquid metal in the circumferential direction. By providing such a supply system, liquid metal supply to the current collectors could be ensured for both directions of rotation, which is normally required for motor applications.

A further alternative would incorporate a plurality of supply passages, plugs and collector feed passages spaced circumferentially about said stator disk. For example, an inlet and outlet passage similar to those shown in FIG. 3 could be provided for each current collector in such a configuration that the feed supply passage would provide liquid metal to only a portion of the groove. A plug would be disposed in the groove at a point spaced a short distance circumferentially away from said collector feed passage in the direction of rotation of the liquid metal. Thereby, the pressure would be limited to that, which can be produced in the liquid metal by the circumferential force generated by the interaction of radial current and axial field flux, acting over only a part of the collector circumference. The total accummulation of pressure would equal that produced by the field and current interaction upon liquid metal in the portion of the circumference of the groove between the inlet and the plug blocking the passage. Such a construction would provide equal pressure distribution at each collector site during high speed operation. In the structure shown in FIG. 3, a slight amount of pressure difference is developed by the circumferential pumping to consecutive collectors.

The circumferential groove might alternatively be located in the stator collector ring of the outer current collector radially outward from each of the outer current collector raceways, in such a way as to take advantage of the Lorentz forces on the liquid metal, which act in an axial direction, dependent upon terminal configuration, at the entrance to the slots to force liquid metal into each circumferential groove. However, the circumferential motion of the liquid metal produced by viscous drag with the rotor collector surface with the liquid metal provides adequate centrifugal pressure to supply liquid metal into the slot for the circumferential groove. With the terminal configuration shown in FIG. 1, in which groove 58 and slot 60 are located in the iron portion of the stator disks 20, the surfaces of the axial inlet slots may be insulated with a layer 68 of alumina, or other appropriate insulation, to eliminate any Lorentz forces upon the liquid metal, which might impede the flow of liquid metal from the pool surrounding the current collector into each groove.

If the axial width of the groove is approximately one-half the axial thickness of the iron portion of the stator disk, the armature current will divide in proportion to the electrical conductivity of the iron and the liquid metal, usually NaK, and a portion of approximately 20% of the armature current will flow radially through the liquid metal in the groove. Calculations indicate that a groove as described having a plug blocking flow of liquid metal disposed within it will produce a pressure of approximately 15 psi from the interaction of 1000 amperes of current with a 1000 gauss field. A typical field flux density for superconducting field coil machines using iron disks is of the order of 17,000 gauss, producing a flux density in the radially-outer current collectors disposed outside the iron portion of the disks on the order of 1000 to 3000 gauss. Since the current flow available in the armature current of such machines is on the order of many thousands of amperes, e.g., 20,000 amps, the proportions of the groove relative to the disk dimensions can be selected within a relatively wide range to develop the necessary pressure and fluid flow for the liquid metal to provide an adequate supply of liquid metal at each collector site to ensure adequate current-carrying capacity. A typical design pressure for the liquid metal in a compliant raceway-type current collector as shown in the figures, is 2.5 psi. Therefore, clearly the device as described provides adequate pressure and design flexibility in constructing such machines.

BEST MODE

I contemplate utilizing iron rotor and stator disks having the pumping groove cut in the radially-outer periphery of the stator iron disk, as shown in FIG. 1, and fluid flow passages connected thereto to supply a pair of current collectors associated with the stator collector ring to which the stator disk is mounted. The preferred liquid metal is sodium potassium eutectic (NaK); the preferred supply structure is that illustrated in FIG. 3 having a single inlet and outlet and a single plug blocking the groove and a plurality of current collector feed holes through the stator iron disk.

While my invention is illustrated as using the compliant raceway-type current collector, the technique of providing a pressurized supply of liquid metal to current collectors may be applied to a wide variety to current collector configurations. For example, the integral pump concept described herein may be employed with current collector structures as those described in U.S. Pat. No. 4,207,486 and assigned to the instant assignee, the filament brush structure as described in the patent application of R. A. Marshall, Ser. No. 878,786, filed Feb. 17, 1978, now U.S. Pat. No. 4,186,321, issued Jan. 29, 1980, and assigned to the instant assignee, the current collector configuration described in U.S. patent application Ser. No. 934,100, filed Aug. 16, 1978 by R. A. Marshall, and assigned to the instant assignee. A drum-type acyclic machine could also employ the technique using a supply arrangement similar to that for the collectors 30 shown in FIG. 1. This integral pump concept, although described herein as being employed with disk-type acyclic machines, may equally well be employed with other current collector configurations in which a continuous supply of liquid metal is required.

I claim:

1. In an acyclic electrodynamic machine comprising:
a hollow shaft mounted for rotation about an axis;
a plurality of annular electrically conductive rotor disks each mounted concentrically with said shaft and connected thereto by an electrically conductive rotor disk mounting ring;
a first annular electrically conductive rotor collector ring disposed about the radially-outer circumferential surface of each of said rotor disks;
a plurality of annular electrically conductive stator disks interleaved with said rotor disks; each of said stator disks being mounted circumferentially within one of a plurality of electrically conductive stator disk mounting rings and having a first stator collector disposed about the radially inner periphery of said stator disk;
each of said stator disk mounting rings having a second stator collector formed thereon axially adjacent said stator disk and disposed circumferentially around one of said first rotor collector rings;
each of said rotor disk mounting rings having an annular contact surface thereon extending in the axial direction adjacent said rotor disk, radially-inward of a first stator collector, and constituting a second rotor collector ring;
a first plurality of liquid metal current collectors mounted on one of said second stator collectors and each disposed radially adjacent and surrounding one of said first rotor collector rings;
a second plurality of liquid metal current collectors mounted about the inner periphery of one of said first stator collectors and each disposed radially adjacent and surrounding one of said second rotor collector rings; the improvement comprising:

means for supplying liquid metal to each of said current collectors to complete electrical connection between said rotor collector rings and said stator collectors, said means disposed in said stator such that interaction of armature current and field flux in said liquid metal produces an electromagnetic force upon said liquid metal in a generally circumferential direction.

2. The apparatus of claim 1 wherein said means comprises an annular groove in the radially-outer periphery of each said stator disk, a plurality of liquid metal supply passages in each said stator disk in flow communication with said groove and each of said plurality of first current collectors, respectively, a plurality of liquid metal supply passages in each said stator disk in flow communication with said groove and each of said plurality of second current collectors, respectively, and liquid metal return passages in flow communication with said groove and one of said first plurality of current collectors.

3. The apparatus of claim 2 wherein a plug is disposed in said groove to prevent flow of liquid metal through said groove at the location of said plug.

4. The apparatus of claim 3 wherein one side of said rotor disks, one side of said rotor disk mounting rings, one side of said stator disks, and one side of said stator disk mounting rings are coated with a layer of electrical insulation.

5. The apparatus of claim 4 wherein said groove is disposed in said stator disk such that a portion of the armature current flows in a generally radial direction through liquid metal disposed in said groove and a portion of field flux generated by the machine field coils passes generally axially through liquid metal disposed in said groove.

6. The apparatus of claim 2 wherein each of said liquid metal return passages comprises a generally circumferentially elongated slot in one of said stator disks, respectively, disposed adjacent the outer periphery of said one of said stator disks, and said slot being coated with a layer of electrical insulation.

7. The apparatus of claim 1 wherein each of said rotor disks and said stator disks comprises a disk of iron or iron alloy, each of said first rotor collector rings comprises a ring of copper or copper alloy, each of said rotor mounting rings comprises a ring of copper or copper alloy, each of said second rotor collector rings comprises a contact surface on one of said rotor mounting rings, respectively, each of said first stator collectors comprises an arcuate fin of copper or copper alloy projecting radially inward from one of said stator disks, respectively, having a compliant wall surrounding said fin and attached thereto, and each of said second stator collectors comprises an arcuate fin of copper or copper alloy projecting radially inwardly from one of said stator disk mounting rings, respectively, having a compliant wall surrounding said fin and attached thereto.

8. A method of providing a continuous supply of conductive liquid metal to liquid metal current collectors providing electrical connection between rotor and stator disks in a disk-type acyclic machine comprising:

passing armature current generally radially through a quantity of liquid metal disposed in each of a plurality of grooves extending generally circumferentially within said stator;

passing magnetic flux through said quantity of liquid metal in each of said grooves in a generally axial direction; thereby producing circulation of said quantity of liquid metal in a circumferential direction about each said groove;

restricting flow of said liquid metal at at least one location about each said groove; thereby converting electromagnetic force within said liquid metal to pressure;

directing a flow of pressurized liquid metal from said groove to each of a plurality of current collectors; and collecting a portion of said liquid metal from said current collector adjacent said groove to replace the liquid metal pumped to said collectors.

9. The method of claim 8 wherein said step of passing armature current generally radially through a quantity of liquid metal comprises passing armature current generally radially through each stator disk and allowing a portion of said current to flow through said liquid metal.

10. The method of claim 9 wherein said step of passing magnetic flux through said quantity of liquid metal comprises passing a part of the excitation field flux through said grooves in a generally axial direction.

11. The method of claim 10 wherein said step of restricting flow of said liquid metal comprises blocking said groove at said at least one location to prevent flow of said liquid metal circumferentially through said groove at said at least one location.

12. The method of claim 11 wherein said step of directing a flow of pressurized liquid metal from said groove comprises directing a flow of liquid metal generally radially inward through at least one generally radially extending passage in each of said stator disks to a collector disposed radially within said stator disk and directing a flow of liquid metal generally axially through at least one generally axially extending passage to a current collector disposed adjacent said stator disk and radially outside one of said rotor disks.

* * * * *